2,917,534
2-NITRO-3,4,6-TRICHLOROPHENYL ALKYL CARBONATES

Jacqueline G. Sims, Midland, and Clarence L. Moyle, Clare, Mich., assignors to The Dow Chemical Company, Midland, Mich., a corporation of Delaware No Drawing. Application August 9, 1957
Serial No. 677,201

6 Claims. (Cl. 260—463)

The present invention relates to 2-nitro-3,4,6-trichlorophenyl alkyl carbonates having the formula

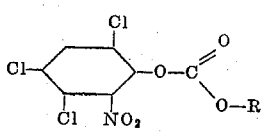

In this and succeeding formulas, R represents a lower alkyl radical containing from 1 to 5 carbon atoms, inclusive. These compounds are crystalline solids somewhat soluble in many organic solvents and of low solubility in water. They have been found to be useful as parasiticides and are adapted to be employed as active toxic constituents of compositions for the control of insects, lamprey, fish and fungi such as *Rhizoctonia solani* and *Fusarium oxysporum lycopersicum*. The compounds are also useful as herbicides for the control of many undesirable plant species.

The new compounds may be prepared by reacting a haloformate of the formula

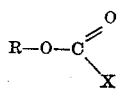

wherein X represents a halogen preferably chlorine or bromine with an alkali metal salt of 2-nitro-3,4,6-trichlorophenol. The alkali metal salt employed is preferably the potassium or sodium salt and many be prepared by reacting an excess of potassium hydroxide or sodium hydroxide with the phenol in water or other inert solvent. The reaction is carried out in the presence of an inert solvent such as benzene, carbon tetrachloride or ethylene dichloride and conveniently in the water employed in the preparation of the alkali metal salt. The reaction may be effected in the presence of a catalytic amount of a catalyst such as sulfuric acid or stannic chloride. Good results are obtained when employing substantially equimolecular proportions of the haloformate and alkali metal phenolate. The reaction is somewhat exothermic and takes places smoothly at the temperature range of from 0° to 100° C. with the formation of the desired product and alkali metal halide of reaction. The temperature may be controlled by regulating the rate of contacting the reagents and by external cooling.

In carrying out the reaction, the haloformate, alkali metal phenolate and catalyst, if employed, are contacted together in the reaction solvent with stirring and at a temperature of from 0° to 100° C. Upon completion of the reaction, the desired product may be separated by conventional methods such as fractional distillation under reduced pressure, and evaporation of reaction solvent followed by subsequent cooling to facilitate crystallization of the product. The product may be purified by recrystallization from suitable organic solvents.

The following examples illustrate the invention but are not to be construed as limiting:

*Example 1.—2-nitro-3,4,6-trichlorophenyl methyl carbonate*

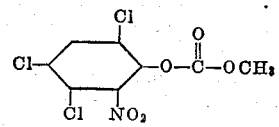

Potassium 2-nitro-3,4,6-trichlorophenolate was prepared by adding a solution of 33.7 grams (0.60 mole) of potassium hydroxide in 200 milliliters of water to a solution of 75 grams (0.31 mole) of 2-nitro-3,4,6-trichlorophenol in 100 milliliters of water. The addition was carried out with stirring and at a temperature of from 24° to 40° C. To the resulting potassium salt solution thus formed there was added portionwise with stirring 94.5 grams (1.0 mole) of methyl chloroformate. The addition was carried out at room temperature and over a period of one hour. Following the addition, stirring was continued for 30 minutes and the reaction mixture was then set aside for 2.5 hours. During this period, the mixture separated into an aqueous layer and an organic layer. The organic layer was separated, washed with water and cooled to obtain a 2-nitro-3,4,6-trichlorophenyl methyl carbonate product as a crystalline solid. This product melted at 70.2°–70.8° C. and contained 35.5 percent chlorine which corresponds to the theoretical chlorine content.

*Example 2.—2-nitro-3,4,6-trichlorophenyl ethyl carbonate*

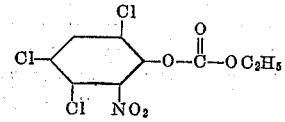

A solution of 22.5 grams (0.412 mole) of potassium hydroxide in 200 milliliters of water was added portion wise with stirring to a solution of 50 grams (0.206 mole) of 2-nitro-3,4,6-trichlorophenol in 50 milliliters of water. The addition was carried out over a period of 30 minutes and at a temperature of from 24° to 35° C. To the aqueous solution thus formed, 100 grams (0.92 mole) of ethyl chloroformate was added portionwise over a period of one hour and at a temperature of from 24° to 42° C. Following the addition, stirring was continued for 30 minutes to insure completion of the reaction. The reaction mixture was then washed with water and thereafter fractionally distilled under reduced pressure to separate a 2-nitro-3,4,6-trichlorophenyl ethyl carbonate product which boiled at 178°–179° C. at 0.6 milliliter pressure. Upon cooling, the distillate crystallized in the form of yellow needles which melted at 148.6°–150.3° C. and contained 33.98 percent chlorine compared to the calculated value of 33.92 percent.

*Example 3.—2-nitro-3,4,6-trichlorophenyl normal-propyl carbonate*

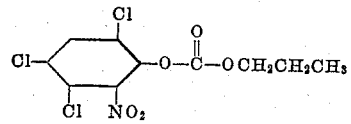

Potassium 2-nitro-3,4,6-trichlorophenolate was prepared by adding portionwise a solution of 20.4 grams (0.364 mole) of potassium hydroxide in 100 milliliters of water to a solution of 45.5 grams (0.187 mole) of 2-nitro-3,4,6-trichlorophenol in 100 milliliters of water. The addition was carried out over a period of 25 minutes and at a temperature of from 24° to 35° C. To the potassium salt solution thus formed there was added portionwise with stirring 100 grams (0.815 mole) of normal-propyl chloroformate. The addition was carried out over a period of 90 minutes and at a temperature of from 30° to 36° C. Following the addition, stirring was continued for one hour at a temperature of from 35° to 38° C. The reaction mixture was then successively washed with 5 percent aqueous sodium bicarbonate and water, and thereafter dried under vacuum. As a result of these operations, there was obtained a 2-nitro-3,4,6-trichlorophenyl normal-propyl carbonate product as a white solid. This product was recrystallized from isopropyl alcohol and found to melt at 60.3°–61.4° C. and contain 32.42 percent chlorine which corresponds to the theoretical chlorine content.

*Example 4.—2-nitro-3,4,6-trichlorophenyl isopropyl carbonate*

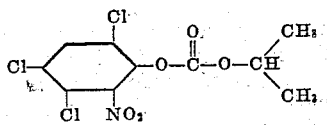

An aqueous solution of potassium 2-nitro-3,4,6-trichlorophenolate was prepared by adding a solution of 11.2 grams (0.2 mole) of potassium hydroxide in 50 milliliters of water portionwise with stirring to a solution of 24.25 grams (0.1 mole) of 2-nitro-3,4,6-trichlorophenol in 25 milliliters of water. The addition was carried out over a period of 30 minutes and at room temperature. To the resulting solution was added portionwise with stirring 55 grams (0.412 mole) of isopropyl chloroformate over a period of 25 minutes. Stirring was then continued for a period of 3 hours, and the reaction mixture thereafter successively washed with a 2 percent aqueous sodium bicarbonate and water, and the washed mixture dried over anhydrous sodium sulfate. The dried product was thereafter fractionally distilled at a temperature of from 41° to 50° C. at 50 millimeters pressure to separate a 2-nitro-3,4,6-trichlorophenyl isopropyl carbonate product as a yellow crystalline solid. This product was recrystallized from isopropyl alcohol and found to have a melting point of 66.6°–68.2° C.

*Example 5.—2-nitro-3,4,6-trichlorophenyl normal-butyl carbonate*

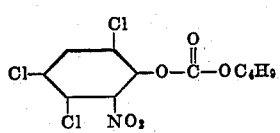

18.7 grams (0.334 mole) of potassium hydroxide was dissolved in 100 milliliters of water and added portionwise with stirring to a solution of 41.7 grams (0.172 mole) of 2-nitro-3,4,6-trichlorophenol in 100 milliliters of water. The addition was carried out at a temperature of from 24° to 35° C. and over a period of 25 minutes. To the potassium salt solution thus formed there was added portionwise with stirring 100 grams (0.732 mole) of normal-butyl chloroformate. The addition was carried out over a period of one hour and at a temperature of from 35° to 42° C. Following the addition, stirring was continued for an additional hour at a temperature of about 35° C., and the reaction mixture thereafter successively washed with 5 percent aqueous sodium bicarbonate and water, and dried under vacuum. Upon cooling, the dried product formed a solid crystalline mass, which was subsequently recrystallized from isopropyl alcohol. As a result of these operations, there was obtained a 2-nitro-3,4,6-trichlorophenyl normal-butyl carbonate product which had a melting point of 60.2°–61.0° C.

*Example 6.—2-nitro-3,4,6-trichlorophenyl normal-amyl carbonate*

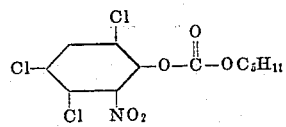

Potassium 2-nitro-3,4,6-trichlorophenolate was prepared as described in Example 1 by the reaction of 16.9 grams (0.30 mole) of potassium hydroxide in 100 milliliters of water and 37.5 grams (0.114 mole) of 2-nitro-3,4,6-trichlorophenol. To the potassium salt solution thus formed there was added portionwise with stirring 100 grams (0.663 mole) of normal-amyl chloroformate. The addition was carried out over a period of 35 minutes and at a temperature of from 35° to 40° C. Following the addition, the reaction mixture was stirred for one hour and at a temperature of from 55° to 60° C., and thereafter washed with water. As a result of these operations, there was obtained as a residue a 2-nitro-3,4,6-trichlorophenyl normal-amyl carbonate product. 2-nitro-3,4,6-trichlorophenyl normal-amyl carbonate has a molecular weight of 356.5.

The compounds of the present invention are valuable as herbicides and parasiticides for the control of bacteria and fungi such as *Salmonella typhosa*, *Penicillium digitatum* and *Rhizopus nigricans*. For such use, the compounds may be dispersed on a finely divided solid and employed as dusts. The new products may also be employed in oils, as constituents of aqueous emulsions or aqueous dispersions. In a representative operation, solid nutrient agar media saturated with 2-nitro-3,4,6-trichlorophenyl ethyl carbonate were streaked with suspensions of viable spores of *Aspergillus terreus*, *Erwinia carotovora* and *Staphylococcus aureus* and incubated at 30° C. for three days. At the end of this period, complete inhibition of the test organisms was observed.

We claim:

1. The 2-nitro-3,4,6-trichlorophenyl alkyl carbonate corresponding to the general formula

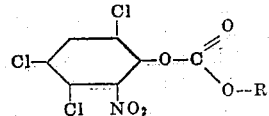

wherein R represents a lower alkyl radical.

2. 2-nitro-3,4,6-trichlorophenyl methyl carbonate.
3. 2-nitro-3,4,6-trichlorophenyl ethyl carbonate.
4. 2-nitro-3,4,6-trichlorophenyl normal-propyl carbonate.
5. 2-nitro-3,4,6-trichlorophenyl isopropyl carbonate.
6. 2-nitro-3,4,6-trichlorophenyl normal-butyl carbonate.

References Cited in the file of this patent

UNITED STATES PATENTS 2,510,025   Moyle _____ May 30, 1950
2,567,987   Baumgartner _____ Sept. 18, 1951

OTHER REFERENCES

Harrison: Chem. Abstracts, 1943, vol. 37, p. 5036.
Synerholm et al.: Contrib. Boyce Thompson Inst., vol. 14, pp. 91–92 (1945).
Miyaki et al.: Chemical Abstracts, vol. 44 (1950), pp. 3196-3197.